United States Patent
Park (10) Patent No.: US 10,154,032 B2
(45) Date of Patent: Dec. 11, 2018

(54) METHODS FOR SECURITY SYSTEM-AGNOSTIC UNIFORM DEVICE IDENTIFICATION

(71) Applicant: Comcast Cable Communications, LLC, Philadelphia, PA (US)

(72) Inventor: Kyong Park, Haverford, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/755,756

(22) Filed: Jun. 30, 2015

(65) Prior Publication Data
US 2016/0072807 A1    Mar. 10, 2016

Related U.S. Application Data

(60) Provisional application No. 62/048,067, filed on Sep. 9, 2014.

(51) Int. Cl.
| | |
|---|---|
| *H04L 29/00* | (2006.01) |
| *H04L 29/06* | (2006.01) |
| *G06F 21/44* | (2013.01) |
| *H04L 9/08* | (2006.01) |
| *H04L 9/32* | (2006.01) |
| *G06F 21/10* | (2013.01) |

(52) U.S. Cl.
CPC .......... *H04L 63/0876* (2013.01); *G06F 21/10* (2013.01); *G06F 21/44* (2013.01); *H04L 9/0841* (2013.01); *H04L 9/3263* (2013.01); *H04L 9/3271* (2013.01); *H04L 63/061* (2013.01); *H04L 2209/603* (2013.01)

(58) Field of Classification Search
CPC ........... G06F 21/31; G06F 21/44; H04L 29/00
USPC ........................................................ 713/171
See application file for complete search history.

(56) References Cited

U.S. PATENT DOCUMENTS

| | | | |
|---|---|---|---|
| 8,738,898 B2* | 5/2014 | Herwono | H04L 9/0822 380/247 |
| 2015/0310194 A1* | 10/2015 | Zhang | G06F 21/31 726/9 |

* cited by examiner

*Primary Examiner* — Brandon S Hoffman
*Assistant Examiner* — Michael D Anderson
(74) *Attorney, Agent, or Firm* — Ballard Spahr LLP (57) ABSTRACT

Systems and methods can comprise receiving an authentication request according to a first security protocol from a user device. Responsive to a determination that the authentication request is trustworthy according to the first security protocol, a device identifier and information related to a shared key are transmitted to the user device. A content request to access content secured according to a second security protocol is received from the user device. The content request can comprise the device identifier and can be encrypted using a shared key derived from the information related to the shared key. The content request can be decrypted using the shared key, and authenticated based on the device identifier.

20 Claims, 5 Drawing Sheets

METHODS FOR SECURITY SYSTEM-AGNOSTIC UNIFORM DEVICE IDENTIFICATION

CROSS REFERENCE TO RELATED PATENT APPLICATION

This application claims priority to U.S. Provisional Application No. 62/048,067 filed Sep. 9, 2014, herein incorporated by reference in its entirety.

BACKGROUND

Content service providers, including distributors, networks, and studios, target a diverse set of device classes including set-tops, Internet-connected televisions, mobile tablets, mobile handsets, PCs, gaming devices, and other leased or customer-owned consumer electronic platforms. While this diverse set represents multiple form factors, distributors seek to establish a common and pervasive brand presence across all screens in the customer's electronic device ecosystem. One way to help establish a common brand is to include a common user login (authentication) process across multiple form factors. Further, device authentication is critical to protecting content monetization. Usage permissions are granted to authenticated users in ways that permit normal user consumption habits and limit consumption to prevent content sharing beyond the boundary of the customer account (and associated customer devices). Accurate usage management practices, such as concurrent stream and device limits, are thus anchored on accurate device authentication. Accordingly, it is desirable to establish a coherent and consistent method of authenticating users. A dedicated public key infrastructure (PKI) is secure, but not compatible across all devices, and requires installation of additional software on user devices. System host identifiers (e.g., a manufacturer serial number) are not consistently available across device classes, and are not easily verifiable. Third party content security solutions, such as a digital rights management (DRM) solutions are often accessible across all classes of devices where content is permitted, but these security solutions can be short-lived and are not verifiable outside of the security solution. Accordingly, switching security solutions and/or using a device identity verified by one security solution to access content from another resource outside of that security solution is not feasible. These and other shortcomings are addressed in the present disclosure.

SUMMARY

It is to be understood that both the following general description and the following detailed description are exemplary and explanatory only and are not restrictive. Methods and systems are described for accurately identifying and authenticating devices, divorced from a particular security solution used by any particular device. The methods allow for a device to be authenticated using any of a variety of security solutions, and produce identifiers that are independent of the device type and/or security solution used when authenticating. The methods further allow for devices to request content that requires a security solution other than that used during the authentication process. Still further, the methods allow for a particular device to renew the identification and authentication provided to the device.

Content distribution systems strive to provide a uniform and user-friendly experience. However, this can be difficult, since users access the content distribution system from a variety of devices over which a content provider has varying levels of control. For example, the content provider can lease some devices to users, allowing the content provider substantial control over the software and hardware present in those user devices; at the same time, other user devices are owned by the user and do not allow the content provider to install additional hardware or software. The present disclosure relates to methods and systems for uniform device identification, authentication, and renewal, separated from any particular session or security solution. This can be accomplished by using any security solution already present on the device for a one-time authentication of the device. Subsequently, the device can communicate with a network device (e.g., an identity provider) that is part of the content distribution system to exchange verified public key parameters to create a key agreement between the content distribution system and the device. The network device can then provide a verified identity to the device using the agreed-upon key.

In an aspect, systems and methods can comprise receiving an authentication request according to a first security protocol from a user device. Responsive to a determination that the authentication request is trustworthy according to the first security protocol, a device identifier and information related to a shared key are transmitted to the user device. A content request to access content secured according to a second security protocol is received from the user device. The content request can comprise the device identifier and can be encrypted using a shared key derived from the information related to the shared key. The content request can be decrypted using the shared key, and authenticated based on the device identifier.

In another aspect, systems and methods can comprise receiving an authentication request from a user device according to a first security protocol. A device identifier and information related to a shared key can be transmitted to the user device in response to a determination that the authentication request is trustworthy according to the first security protocol. An identity renewal request can be received from the user device. The identity renewal request can comprise the device identifier, and can be encrypted using a shared key derived from the information related to the shared key. The identity renewal request can be decrypted using the shared key, and authenticated based on the device identifier. A new shared key corresponding to the user device can be negotiated in response to the authentication of the identity renewal request. The new shared key can be associated with the device identifier. The device identifier and information related to the new shared key can be transmitted to the user device.

In still another aspect, systems and methods can comprise receiving a first authentication request from a first user device according to a first security protocol, and receiving a second authentication request from a second user device according to a second security protocol. A first shared key can be negotiated with the first user device in response to determining that the first authentication request is trustworthy according to the first security protocol. A second shared key can be negotiated with the second user device in response to determining that the second authentication request is trustworthy according to the second security protocol. A first device identifier and information related to the first shared key can be transmitted to the first user device. The first device identifier and the information related to the first shared key can each be independent of the first security protocol of the first authentication request. A second device second identifier and information related to the second shared key can be transmitted to the second user device. The second device identifier and the information related to the second shared key can each be independent of the second security protocol of the second authentication request.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions can also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions can also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Conventional content service providers can access several security solutions. However, the accessible security solutions might be inconsistent. For example, certain security solutions may be tailored to particular classes of devices.

Accordingly, client identities can conventionally be provisioned across a variety of security solutions. For example, a content service provider can deploy one DRM solution for interactions with mobile clients, a second DRM solution for personal computer-based clients, and a separate host security solution for managed and/or proprietary devices such as set-top boxes. Moreover, under circumstances such as an evolution in business terms and/or a security breach, the security solution provisioned on a device can be replaced. Consequently, security solutions that provide a client device identity can be ubiquitous, but also inconsistent and volatile.

Furthermore, content distribution systems strive to provide a uniform and user-friendly experience. However, this can be difficult, since users access the content distribution system from a variety of devices over which a content provider has varying levels of control. For example, the content provider might lease some devices to users, allowing the content provider substantial control over the software and hardware present in those user devices; at the same time, other user devices are owned by the user and do not allow the content provider to install additional hardware or software.

The present disclosure relates to methods and systems for uniform identification and authentication of a user device, separated from any particular session or security solution (e.g., a DRM solution, a pre-shared key, etc.). This can be accomplished by using any security solution provided on the user device for a one-time authentication of the device. The user device can send a request to a content distribution system using a protocol based on the security solution installed on the user device. The content distribution system can authenticate the request using the respective security solution. Subsequently, the user device can communicate with a network device that is part of the content distribution system to exchange verified public key parameters and can thus perform steps of a key agreement protocol (e.g., Diffie-Hellman protocol) to establish a shared key that can be used to authenticate communication between the user device and the content distribution system. The network device can then generate a unique identity for the user device and transmit the unique identity and the shared key to the user device using the security solution of the user device. The user device can extract the identity and shared key information received from the network device. Further communications between the user device and the content distribution system can then be authenticated using the identity and shared key, obviating the need for the security solution installed on the user device.

The present disclosure relates to methods and systems for uniform device identification, authentication, and renewal, separated from any particular session or security protocol. This can provide a uniform and user-friendly experience. The methods allow for consistent identification across multiple classes of device (e.g., personal computers, mobile phones, tablet computers, and set-top boxes). The methods can also enable a consistent user experience regardless of the particular device, the security solutions installed on the device, or the content provider's ability to control software available on the device. The methods and systems described herein enable verifiable authentication without need for installation of particular Public Key Infrastructure (PKI) software on a device and without requiring use of a particular third-party PKI.

Uniform device authentication can be achieved by decoupling a device authentication handshake (e.g., a DRM license request) from session client device identifiers and keys. That is, the authentication handshake is used to authenticate the device once, but a new identity and key are established for communication between the user device and the content distribution system. The new identity and key can be selected to be consistent across multiple device classes and can be independent of the security solution originally used by the user device to contact the content distribution system.

Each security solution can provide a basis for mutually-authenticated client/server communication. A mutually-authenticated interaction is conducted between a client device and the network device to exchange verified public key parameters for the purposes of establishing key agreement between the two parties. Using a secure key negotiation protocol (e.g., the Diffie Hellman protocol), the mutually-authenticated interaction is optionally encrypted. The network device can grant an identifier paired with a mutually-authenticated and established cryptographic key assigned to the client device. The identity architecture can use the device identifier and the key as a basis from which to derive new keys for various applications.

After authentication, a user device can be assigned a device identity by a device identity provider system that is part of the content distribution system. The device identity provider system can be configured to trust multiple third party certificate authorities and/or one or more agreed upon shared secret systems. Secure communication, such as mutually-authenticated protocols can be made available via vendor-based proprietary mechanisms connected to security solutions. For example, the device identity provider system can connect to third party DRM solutions for communicating with user devices provisioned with those DRM solutions. The device identity provider system can also connect to open non-proprietary mechanisms for communicating with user devices provisioned with other security solutions, such as devices where a key (or key derivative) is provided at the time of manufacture (e.g., devices owned by the content provider and leased to users).

The device identity provider system can be global (e.g., have a scope that encompasses all device classes) and uniform in format across device classes. The device identity provider system can include both a verifiable identifier through pairing a device to a content distribution system using a secret/private key and a verifiable key through certification by a trusted third party of a pre-shared secret. The device identity provider system can also control the lifespan of the identification, and can be stable in a security breach situation.

In general, a device identity provider system can rely upon and be concurrently compatible with multiple key structures (e.g., public keys compliant with the International Telecommunication Union Telecommunication Standardization Sector (ITU-T) X.509 standard, public keys not compliant with the X.509 standard, symmetric keys, etc.). The device identity provider system can be used without the need to install a fully-independent system such as a Public Key Infrastructure (PKI) onto client devices. The device identity provider system can be fully compatible with third party PKI systems, DRM clients, and non-DRM clients.

Figure 1:
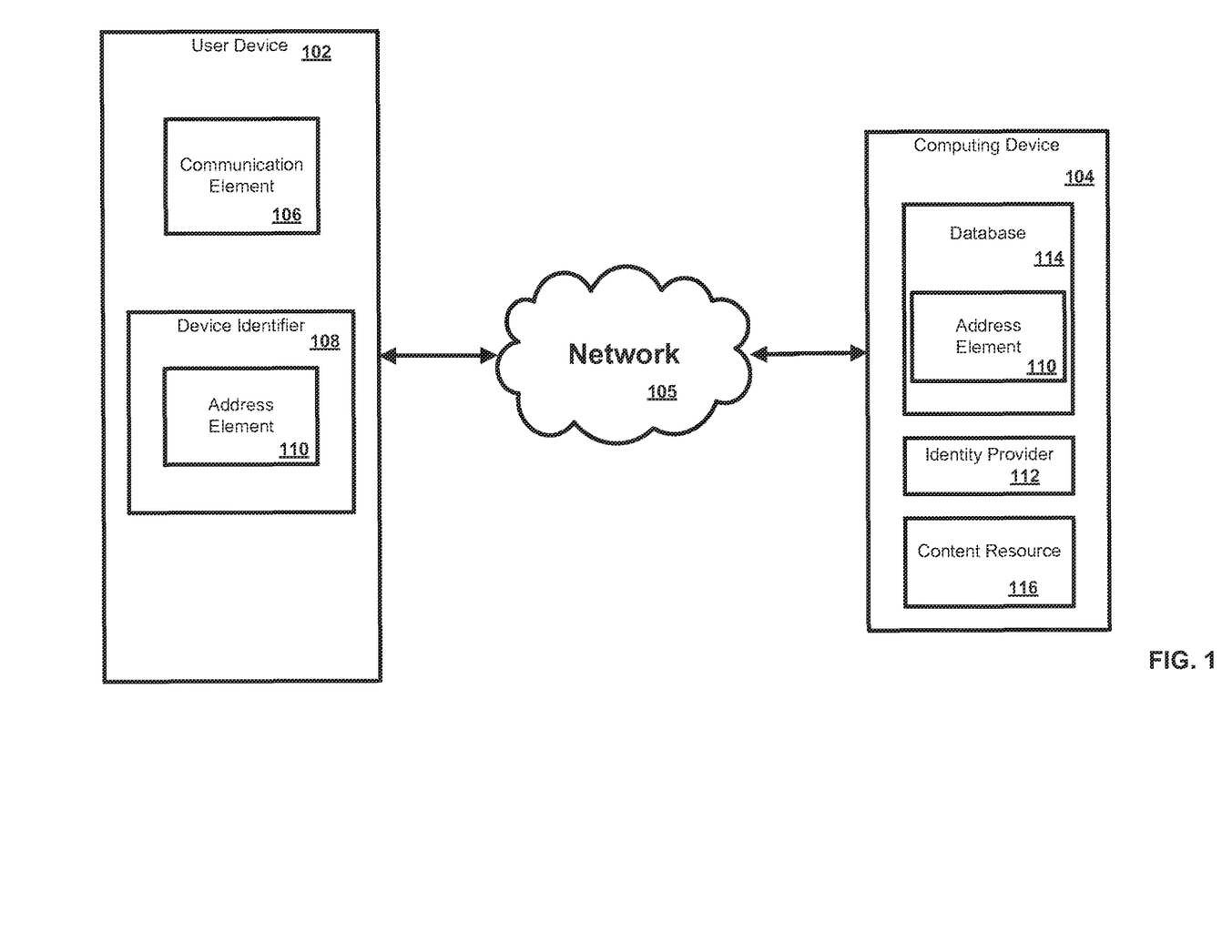
FIG. 1 is a block diagram of an exemplary network.

After an identity has been assigned to a user device, any identity solution available to the device identity provider system can be used to refresh the existing identity, fully replace the existing identity, or determine that access by the user device should be permanently revoked In one aspect of the disclosure, a system can be configured to provide services such as network-related services to one or more user devices. FIG. 1 illustrates various aspects of an exemplary environment in which the present methods and systems can operate. In an aspect, the environment shown in FIG. 11 can be used to provide services to a device, for example, a user device such as a computer, tablet, mobile device, smart television, set-top box, or the like.

The network and system can comprise one or more user devices 102 in communication with a computing device 104 such as a server. The computing device 104 can be disposed locally or remotely relative to each of the user devices 102. As an example, the user devices 102 and the computing device 104 can be in communication via a private and/or public network 105 such as the Internet or a local area network. Other forms of communications can be used such as wired and wireless telecommunication channels, for example.

In an aspect, each user device 102 can be an electronic device such as a computer, a smartphone, a laptop, a tablet, a set top box, a display device, or other device capable of communicating with the computing device 104. As an example, each user device 102 can comprise a communication element 106 for providing an interface to a user to interact with the user device 102 and/or the computing device 104. The communication element 106 can be any interface for presenting and/or receiving information to/from the user, such as user feedback. An example interface can be a communication interface such as a web browser (e.g., Internet Explorer®, Mozilla Firefox®, Google Chrome®, Safari®, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, each of the user devices 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110. In an aspect, the address element 110 can comprise or provide an internet protocol address, a network address, a media access control (MAC) address, an Internet address, or the like. As an example, the address element 110 can be relied upon to establish a communication session between the user devices 102 and the computing device 104 or other devices and/or networks. As a further example, the address element 110 can be used as an identifier or locator of the user devices 102. In an aspect, the address element 110 can be persistent for a particular network. In an aspect, the address element 110 can be stored remotely from the user corresponding device 102 and retrieved by one or more devices such as the user device 102 and the computing device 104.

In an aspect, the computing device 104 can be a server for communicating with the user device 102. As an example, the computing device 104 can communicate with the user device 102 for providing data and/or services. As an example, the computing device 104 can provide services such as network (e.g., Internet) connectivity, network printing, media management (e.g., media server), content services, streaming services, broadband services, or other network-related services. In an aspect, the computing device 104 can allow the user device 102 to interact with remote resources such as data, devices, and files. As an example, the computing device 104 can be configured as (or disposed at) a central location (e.g., a headend, or processing facility), which can receive content (e.g., data, input programming) from multiple sources. The computing device 104 can combine the content from the multiple sources and can distribute the content to user (e.g., subscriber) locations via a distribution system. In an aspect, the computing device 104 can comprise an identity provider 112 and a content resource 116. The identity provider 112 can authenticate the user device 102 using a plurality of security protocols, such as PKI-based digital rights management (DRM) protocols, shared secret systems, and the like. The content resource 116 can be configured to control access to content. In particular, as shown in FIG. 4, the content resource can allow a user device that submitted a content request to access the requested content, provided that the user device has been properly authenticated and the user device has been assigned an identity. Authentication and identity assignment can be established as shown in any of FIGS. 3-5.

In an aspect, the user device 102 can transmit an authentication request to the computing device 104, through the network 105 using the communication element 106. In an aspect, the authentication request can be transmitted as a data packet using protocols such as IPv4 or IPv6. The computing device 104 can receive the authentication request from the user device 102 and the identity provider 112 can authenticate the received data. In an aspect, the computing device 104 processes the received authentication request according to the methods described herein.

In an aspect, the computing device 104 can manage the communication between the user devices 102 and a database 114 for sending and receiving data therebetween. As an example, the database 114 can store a plurality of files (e.g., web pages), user identifiers or records, content, or other information. As a further example, the user device 102 can request and/or retrieve a file from the database 114. In an aspect, the database 114 can store information relating to each user device 102 such as the address element 110. As an example, the computing device 104 can obtain the device identifier 108 from the user device 102 and retrieve information from the database 114 such as the address element 110. As a further example, the computing device 104 can obtain the address element 110 from the user device 102 Any information can be stored in and retrieved from the database 114. The database 114 can be disposed remotely from the computing device 104 and accessed via direct or indirect connection. The database 114 can be integrated with the computing system 104 or some other device or system.

In an aspect, the address element 110 can comprise one or more identifiers that can be or relate to an Internet Protocol (IP) Address IPV4/IPV6 or a media access control address (MAC address) or the like. As a further example, the one or more identifiers can be a unique identifier for facilitating communications on the physical network segment. In an aspect, each of the user devices 102 can comprise a distinct address element 110. As an example, the address element 110 can be associated with a physical location of the user devices 102.

Figure 2:
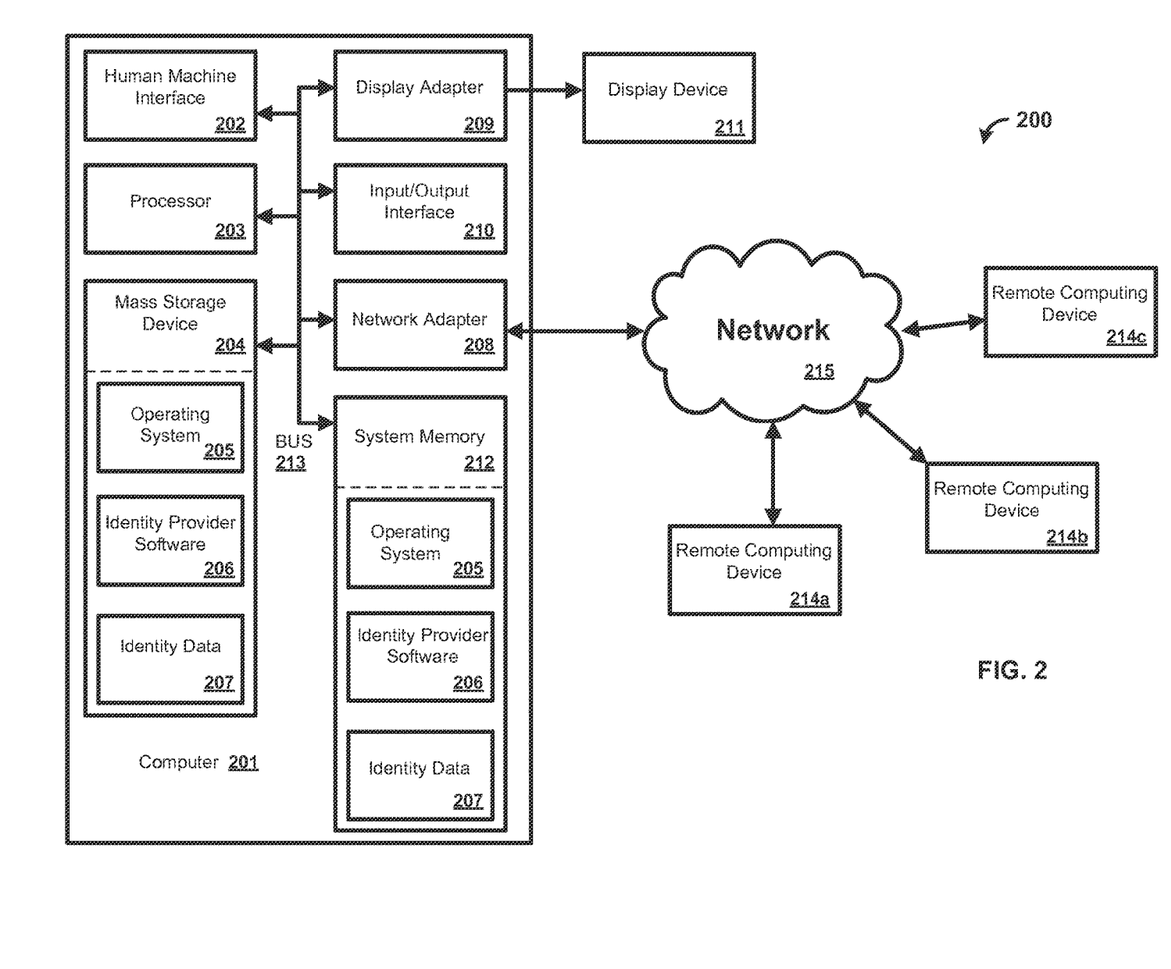
FIG. 2 is a block diagram of an exemplary computing system.

In an exemplary aspect, the methods and systems can be implemented on a computer 201 as illustrated in FIG. 2 and described below. By way of example, the computing device 104 of FIG. 1 can be a computer 201 as illustrated in FIG. 2. Similarly, the methods and systems disclosed can utilize one or more computers to perform one or more functions in one or more locations. FIG. 2 is a block diagram illustrating an exemplary operating environment 200 for performing the disclosed methods. This exemplary operating environment 200 is only an example of an operating environment and is not intended to suggest any limitation as to the scope of use or functionality of operating environment architecture. Neither should the operating environment 200 be interpreted as having any dependency or requirement relating to any one or combination of components illustrated in the exemplary operating environment 200.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media including memory storage devices.

Further, one skilled in the art will appreciate that the systems and methods disclosed herein can be implemented via a general-purpose computing device in the form of a computer 201. The computer 201 can comprise one or more components, such as one or more processors 203, a system memory 212, and a bus 213 that couples various components of the computer 201 including the one or more processors 203 to the system memory 212. In the case of multiple processors 203, the computer 201 can utilize parallel computing.

The bus 213 can comprise one or more of several possible types of bus structures, such as a memory bus, memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and one or more of the components of the computer 201, such as the one or more processors 203, a mass storage device 204, an operating system 205, identity provider software 206, identity data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computer 201 typically comprises a variety of computer readable media. Exemplary readable media can be any available media that is accessible by the computer 201 and comprises, for example and not meant to be limiting, both volatile and non-volatile media, removable and non-removable media. The system memory 212 can comprise computer readable media in the form of volatile memory, such as random access memory (RAM), and/or non-volatile memory, such as read only memory (ROM). The system memory 212 typically can comprise data such as identity data 207 and/or program modules such as operating system 205 and identity provider software 206 that are accessible to and/or are operated on by the one or more processors 203.

In another aspect, the computer 201 can also comprise other removable/non-removable, volatile/non-volatile computer storage media. The mass storage device 204 can provide non-volatile storage of computer code, computer readable instructions, data structures, program modules, and other data for the computer 201. For example, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and identity provider software 206. One or more of the operating system 205 and identity provider software 206 (or some combination thereof) can comprise elements of the programming and the identity software 206. Identity data 207 can also be stored on the mass storage device 204. Identity data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 215.

In one aspect, the user can enter commands and information into the computer 201 via an input device (not shown). Examples of such input devices comprise, but are not limited to, a keyboard, pointing device (e.g., a computer mouse or remote control), a microphone, a joystick, a scanner, tactile input devices such as gloves, and other body coverings, motion sensor, and the like These and other input devices can be connected to the one or more processors 203 via a human machine interface 202 that is coupled to the bus 213, but can be connected by other interface and bus structures, such as a parallel port, game port, an IEEE 1394 Port (also known as a Firewire port), a serial port, network adapter 208, and/or a universal serial bus (USB).

In yet another aspect, a display device 211 can also be connected to the bus 213 via an interface, such as a display adapter 209. It is contemplated that the computer 201 can have more than one display adapter 209 and the computer 201 can have more than one display device 211. For example, a display device 211 can be a monitor, an LCD (Liquid Crystal Display), light emitting diode (LED) display, television, smart lens, smart glass, and/or a projector. In addition to the display device 211, other output peripheral devices can comprise components such as speakers (not shown) and a printer (not shown) which can be connected to the computer 201 via Input/Output Interface 210. Any step and/or result of the methods can be output in any form to an output device. Such output can be any form of visual representation, including, but not limited to, textual, graphical, animation, audio, tactile, and the like. The display 211 and computer 201 can be part of one device, or separate devices.

The computer 201 can operate in a networked environment using logical connections to one or more remote computing devices 214*a,b,c*. By way of example, a remote computing device 214*a,b,c* can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 201 and a remote computing device 214*a,b,c* can be made via a network 215, such as a local area network (LAN) and/or a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components can reside at various times in different storage components of the computing device 201, and are executed by the one or more processors 203 of the computer 201. An implementation of identity provider software 206 can be stored on or transmitted across some form of computer readable media. Any of the disclosed methods can be performed by computer readable instructions embodied on computer readable media. Computer readable media can be any available media that can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 3:
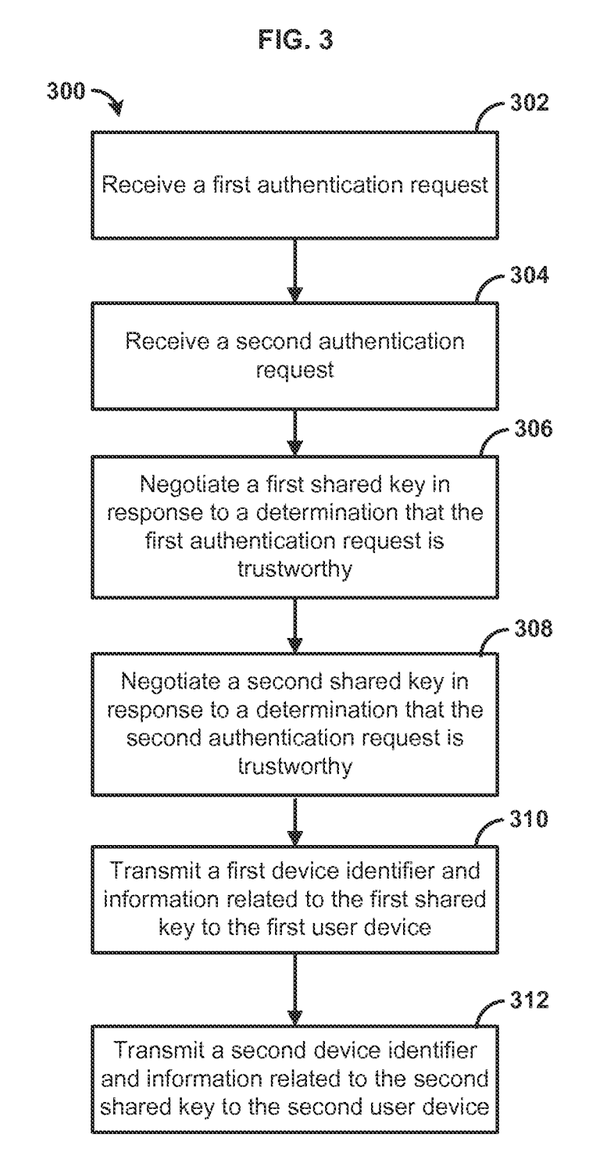
FIG. 3 is a flow chart of an exemplary method.
Figure 4:
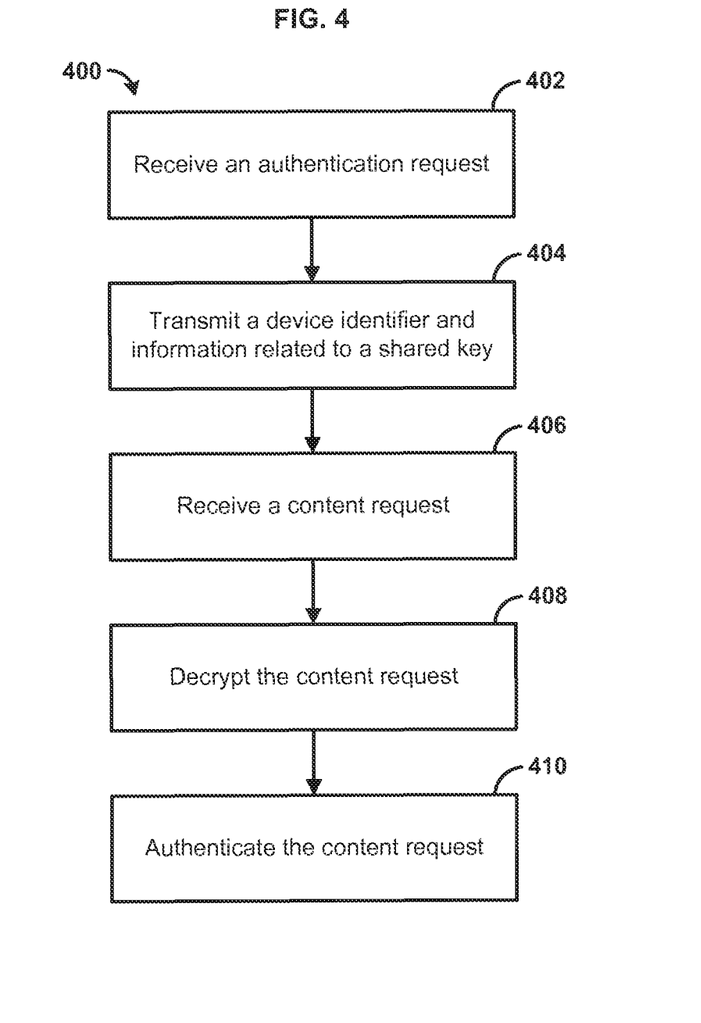
FIG. 4 is a flow chart of an exemplary method.

FIG. 3 illustrates an example method 300. A network device (e.g., the computing device running the identity provider software 206, an identity provider 112, etc.) can receive authentication requests from one or more user devices. Each of the authentication requests received can have a corresponding security solution (e.g., a proprietary DRM solution required by a content provider, a DRM solution put in place by an original equipment manufacturer, a symmetric key solution including a previously agreed-upon symmetric key, and the like).

In step 302, the network device can receive a first authentication request according to a first security protocol selected from among the security solutions from a first user device. In step 304, the network device can receive a second authentication request according to a second security protocol selected from among the security solutions from a second user device. In cases where a DRM security solution is used as one or more of the first security protocol and the second security protocol, the DRM solution can provide a framework for key provisioning (e.g., the DRM server can host a PKI), thus facilitating an ecosystem for secure communication. In an aspect, each of the first authentication request and the second authentication request can be used to establish one or more security primitives (e.g., integrity, freshness, privacy) regarding the authentication request. As an example, the authentication requests can comprise secret information (e.g., a username and password) to verify a user identity. As a further example, the authentication requests can comprise engaging in a third party PKI registration process and signing a key, as well as passing a time based token to ensure that the PKI registration is recent (e.g., within a predefined time period). In an aspect, the network device can be one or more computers, such as personal computers, laptop computers, server computers, mainframe computers, and the like. For example, the network device can comprise a stand-alone server or can operate as software installed on a server used for multiple purposes. In an aspect, one or more of the first user device and the second user device can comprise a personal computer, a laptop computer, a tablet computer, a smartphone, a smart television, a set-top box, and the like.

In an aspect, the first authentication request received in step 302 and the second authentication request received in step 304 can be protected using different security solutions, and can optionally be encrypted. As an example, the first authentication request from a first device can be received as a DRM license request using a first proprietary DRM protocol anchored to a first certificate authority trusted by the network device and the second authentication request can be received from a second device using a second proprietary DRM protocol anchored to a second certificate authority trusted by the network device and encrypted. As another example, the first authentication request can be received from the first device as a digitally signed authentication request to the network device using an open protocol; and the second authentication request received from the second device can be an authentication request using an open protocol encrypted with a symmetric key, such as a key or derivative of a key provisioned in a device at the time of manufacture.

In an aspect, the network device can determine whether the received first authentication request is trustworthy. In an aspect, this determination can be made by authenticating the received first authentication request using a corresponding security solution of the first authentication request. In an aspect, this can comprise determining if the first received authentication request is trustworthy using the first security protocol. As an example, for authentication requests using a DRM protocol, the network device can verify the message with a corresponding trusted certificate authority. In an aspect, the network device can also determine a device class (e.g., personal computer, tablet computer, smartphone, smart television, set-top box, etc.) of the device that transmitted the first authentication request based on content of the received first authentication request.

In an aspect, the network device can determine whether the received second authentication request is trustworthy. In an aspect, this can comprise determining if the second received authentication request is trustworthy using the second security protocol. As an example, for authentication requests using a DRM protocol, the network device can verify the message with a corresponding trusted certificate authority. In an aspect, the network device can also determine a device class (e.g., personal computer, tablet computer, smartphone, smart television, set-top box, etc.) of the device that transmitted the second authentication request based on content of the received second authentication request.

In an aspect, the network device can assign a device identifier to the device in response to each determination that one of the one or more authentication requests is trustworthy. For example, the network device can assign a first device identifier to the first user device in response to receiving the first authentication request, and can assign a second device identifier to the second user device in response to receiving the second authentication request. In an aspect, the assigned device identifier for a particular device can be selected to be compatible with the scope of all identifiers spanning all device classes. In an aspect, the device identifier can be a string according to the Open Software Foundation universally unique identifier (UUID) standard, a series of hex characters, a binary sequence, or any other unambiguous identifier. As an example, the assigned device identifier can be a concatenation of a hash computed over, or otherwise based on one or more of a software version, a timestamp indicating a time that the authentication request was received, a random or pseudo-random number, a vendor identifier, and/or a device class identifier. The assigned device identifier can be selected independent of the security solution used in the received authentication request.

The network device can negotiate a shared key with each device that transmitted the authentication request that has been determined to be trustworthy. In step 306, the network device can negotiate a first shared key with the first user device in response to determining that the first authentication request is trustworthy according to the first security protocol. In step 308, the network device can negotiate a second shared key with the second user device in response to determining that the second authentication request is trustworthy according to the second security protocol. In an aspect, to negotiate each shared key, the network device can require that the user device transmit some or all parameters necessary for exercising a key agreement protocol.

In an aspect, a Diffie-Hellman key exchange can be used to negotiate the shared key, and the parameters can comprise a public half of a Diffie-Hellman key pair. As an example, the network device can create a key pair (e.g., a shared key and a secret key) by combining the public half of the Diffie-Hellman key pair received from the device, a private key maintained by the network device, a modulus, and a generator. In an aspect, the modulus and generator can be selected according to standards such as those promulgated by the Internet Engineering Task Force (IETF) (e.g., an IETF modp subgroup), or can be negotiated as part of the authentication process.

In step 310, the network device can transmit data comprising the first device identifier and information related to the first shared key to the first user device. In step 312, the network device can transmit data comprising the second device identifier and information related to the second shared key to the second user device. In an aspect, the information related to the first shared key can comprise the first shared key generated by the network device; the information related to the second shared key can comprise the second shared key generated by the network device. In another aspect, the first shared key can be provided as an input for a key derivation function. For example, the first shared key can be an input for the National Institute of Standards and Technology (NIST) SP 800-56A Concatenation Key Derivation function to derive an HMAC 160 cipher key, AES128 cipher key, or another cipher key useful for a specific resource target, such as a DRM license server, with the information related to the first shared key comprising the output of the Key Derivation Function. In another aspect, the second shared key can be provided as an input for a key derivation function. For example, the second shared key can be an input for the National Institute of Standards and Technology (NIST) SP 800-56A Concatenation Key Derivation function to derive an HMAC 160 cipher key, AES 128 cipher key, or another cipher key useful for a specific resource target, such as a DRM license server, with the information related to the second shared key comprising the output of the Key Derivation Function.

In an aspect, the network device can receive a security solution renewal message from a first user device using a third security protocol. The security solution renewal message can comprise at least the first device identifier The network device can determine whether or not a security breach required use of the third security protocol. The network device can assign a new device identifier to the first user device if the security solution renewal message was received because of a security breach.

In an aspect, the network device can receive an identity renewal request from one of the one or more devices. For example, the identity renewal request can comprise the first device identifier associated with the first user device and can be encrypted using the first shared key. The network device can negotiate a new shared key with the first user device. The new shared key can be associated with the first device identifier received in the identity renewal request. A renewal message comprising the first device identifier received in the renewal request and information related to the new shared key can be transmitted to the first user device.

In an aspect, the network device can receive a content request from a first user device. The content request can comprise the first device identifier, and can be encrypted using the first shared key. In an aspect, the content request can request access to content secured using another security protocol (e.g., a security protocol other than the one used to authenticate the sender of the content request). The network device can authenticate the content request based on the received first device identifier and the first shared key. Once authenticated, the network device can authorize/permit the first user device to access the content through a content resource.

FIG. 4 illustrates an example method 400. In step 402, a network device can receive an authentication request from a user device. In an aspect, the authentication request can be used to establish one or more security primitives (e.g., integrity, freshness, privacy) regarding the authentication request. As an example, the authentication request can comprise secret information (e.g., a username and password) to verify user identity. As a further example, the authentication request can comprise engaging in a third party PKI registration process and signing a key, as well as passing a time based token to ensure that the PKI registration is recent (e.g., within a predefined time period). In an aspect, the network device can be one or more computers, such as personal computers, laptop computers, server computers, mainframe computers, and the like. For example, the network device can comprise a stand-alone server, or can operate as network device software installed on a server used for multiple purposes. In an aspect, the user device can comprise a personal computer, a laptop computer, a tablet computer, a smartphone, a smart television, a set-top box, and the like. Each of the authentication requests received can be protected using a security solution. An example of a security solution can be a first security protocol such as a proprietary DRM solution required by a content provider, a DRM solution put in place by an original equipment manufacturer, a symmetric key solution including a previously agreed-upon symmetric key, and the like. For example, the authentication request can be received via a first security protocol from among the security solutions. In cases where a DRM solution is used, the DRM solution can provide a framework for key provisioning (e.g., a DRM server can host a PKI), thus facilitating an ecosystem for secure communication. In an aspect, the received authentication request can be encrypted.

In an aspect, the network device can determine whether the received authentication request is trustworthy. In an aspect, this determination can be made by authenticating the received request using a corresponding security solution. For example, when a request is received via the first security protocol, it can be determined to be trustworthy using the first protocol as well. As an example, for authentication requests using a DRM protocol, the network device can verify the message with a corresponding trusted certificate authority or with a pre-shared key of third party PKI. In an aspect, the network device can also determine the device class (e.g., personal computer, tablet computer, smartphone, smart television, set-top box, etc.) of the device that transmitted the request based on content of the received authentication request.

In an aspect, the network device can assign a device identifier to the user device associated with the authentication request in response to receiving the authentication request. In an aspect, the assigned device identifier can be selected to be compatible with the scope of all identifiers spanning all device classes. In an aspect, the device identifier can be a string according to the Open Software Foundation universally unique identifier (UUID) standard, a series of hex characters, a binary sequence, or any other unambiguous identifier. As an example, the assigned device identifier can be a concatenation of and/or a hash computed over one or more of a software version, a timestamp indicating a time that the authentication request was received, a random or pseudorandom number, a vendor identifier, and/or a device class identifier. The assigned device identifier can be selected independent of the security solution used in the received authentication request.

In an aspect, the network device can negotiate a shared key with the user device that transmitted the authentication request. In an aspect, the shared key negotiation can be performed in response to a determination that the authentication request was trustworthy. To negotiate the shared key, the network device can require that the user device transmit parameters necessary for exercising a key agreement protocol.

In an aspect, a Diffie-Hellman key exchange can be used to negotiate the shared key, and the parameters can comprise a public half of a Diffie-Hellman key pair. As an example, the network device can create a key pair (i.e., a shared key and a secret key) by combining the public half of the Diffie-Hellman key pair received from the user device, a private key maintained by the network device, a modulus, and a generator. In an aspect, the modulus and generator can be selected according to standards (e.g., an IETF modp subgroup), or can be negotiated as part of the authentication process.

In step 404, the network device can transmit data comprising the assigned device identifier and information related to the shared key to the device being authenticated. In an aspect, the device identifier and the information related to the shared key can be transmitted to the device in response to a determination that the authentication request was trustworthy. In an aspect, the information related to the shared key can comprise the shared key generated by the network device. In another aspect, the shared key can be provided as an input for a key derivation function. For example, the shared key can be an input for an NIST SP 800-56A Concatenation Key Derivation function to derive an HMAC 160 cipher key, AES 128 cipher key, or another cipher key useful for a specific resource target, such as a DRM license server, with the information related to the shared key comprising the output of the Key Derivation Function.

In step 406, the network device can receive a content request requesting access to a content item at a content resource. A content resource can be, for example, one or more computers, such as personal computers, laptop computers, server computers, mainframe computers, and the like. For example, the content resource can comprise a stand-alone server or can operate as content resource software installed on a server used for multiple purposes. In an aspect, the content resource can be the network device. In another aspect, the network device can act as a gateway by receiving the content request from a user device and transmitting the content request to the content resource. Content and/or content items can comprise, for example, video, audio, still images, combinations thereof, and the like. In an aspect, the content request can comprise an identity token issued by the network device. In an aspect, the identity token can be encrypted using the negotiated key. In another aspect, the identity token can be transmitted unencrypted, and the request for access can comprise the device identifier that can be encrypted using the negotiated key.

In step 408, the network device can decrypt the content request using the shared key. In step 410, the network device can authenticate the content request based on the device identifier. In an aspect, the authentication can permit/authorize the requesting device to access the content item through a content resource.

In an aspect, the authentication can be a multi-step process. In particular, the requested content item can be secured using a security solution other than the security solution used by the requesting device when submitting the authentication request. For example, the content request can be received via a second security protocol that is distinct from the first security protocol. A DRM exchange, such as a DRM license request, can be performed using the second security protocol. As an example, the network device can receive a challenge from a security resource that secures the requested content. In an aspect, the challenge can comprise a security resource identifier to be included in the authentication request. The network device can submit a security resource authentication request comprising the security resource identifier and the device identifier to the security resource, and can receive a security resource authentication result from the security resource based on the security resource authentication request. The network device can then correlate the security resource authentication result and the assigned device identifier associated with the device submitting the content request (i.e., the sender of the authentication request). The request for the content item can be wrapped in a DRM license request (e.g., using the second security protocol). The requesting device can sign the license request using a device key corresponding to the user device and transmit the device to the content resource. The requesting device can further embed an authentication nonce into the DRM license request and separately sign the nonce using the device key so that the content resource can verify the request for the content item. Thus, the request can be authenticated based on the device identifier, without regard to the first security protocol initially used to authenticate the device or the second security protocol used to transmit the content request.

Figure 5:
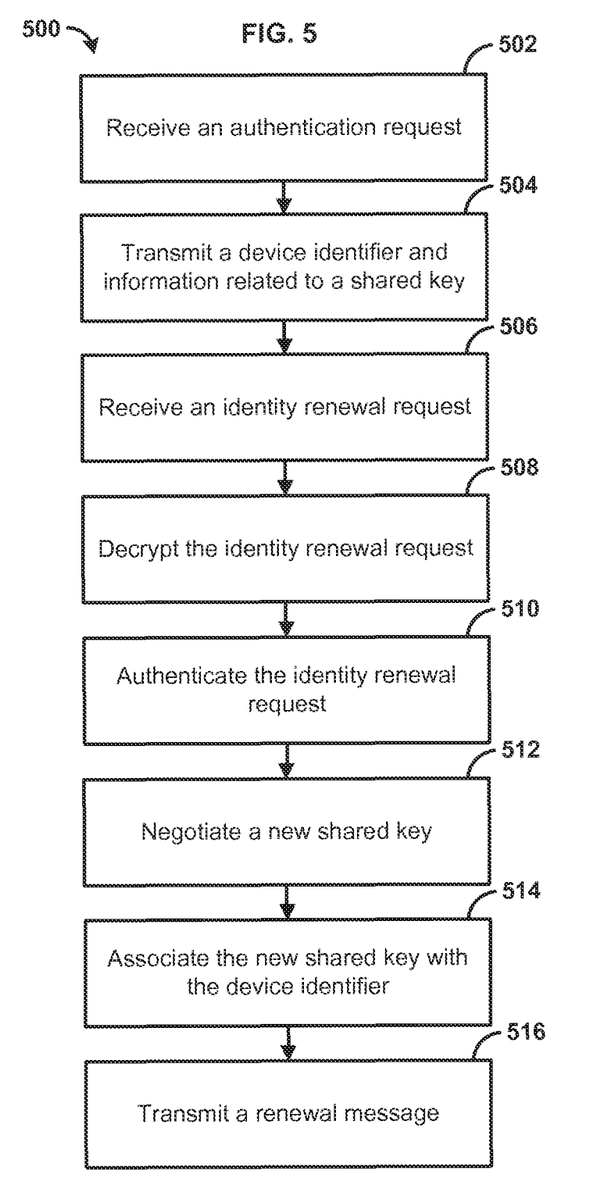
FIG. 5 is a flowchart of an exemplary method.

FIG. 5 illustrates a method 500. In step 502, a network device can receive an authentication request from a user device. In an aspect, the authentication request can be used to establish one or more security primitives (e.g., integrity, freshness, privacy) regarding the authentication request. As an example, the authentication request can comprise secret information (e.g., a username and password) to verify user identity. As a further example, the authentication request can comprise engaging in a third party PKI registration process and signing a key, as well as passing a time based token to ensure that he PKI registration is recent (e.g., within a predefined time period). In an aspect, the network device can be one or more computers, such as personal computers, laptop computers, server computers, mainframe computers, and the like. For example, the network device can comprise a stand-alone server, or can operate as network device software installed on a server used for multiple purposes. In an aspect, the user device can comprise a personal computer, a laptop computer, a tablet computer, a smartphone, a smart television, a set-top box, and the like. In an aspect, the received authentication request can be protected using a security solution, such as a proprietary DRM solution required by a content provider, a DRM solution put in place by an original equipment manufacturer, a symmetric key solution including a previously agreed-upon symmetric key, and the like. For example, the authentication request can be received via a first security protocol. In an aspect, the received authentication request can be encrypted.

In an aspect, the network device can determine whether the received authentication request is trustworthy. In an aspect, this determination can be made by authenticating the received request using a corresponding security solution. As an example, an authentication request received via the first security protocol can be determined to be trustworthy using the first security protocol as well. As a particular example, for authentication requests using a DRM protocol, the network device can verify the message with a corresponding trusted certificate authority or with a pre-shared key of a third party PKI. In an aspect, the network device can also determine the device class (e.g., personal computer, tablet computer, smartphone, smart television, set-top box, etc.) of the device that transmitted the request based on content of the received authentication request.

In an aspect, the network device can assign a device identifier to the device in response to the authentication request. In an aspect, the assigned device identifier can be selected to be compatible with the scope of all device identifiers spanning all device classes. As an example, the assigned device identifier can be a concatenation of and/or a hash computed over one or more of a software version, a timestamp the authentication request was received, a random or pseudorandom number, a vendor identifier, and a device class identifier. In an aspect, the device identifier can be a string selected according to the Open Software Foundation universally unique identifier (UUID) standard, a series of hex characters, a binary sequence, or any other unambiguous identifier. As an example, the assigned device identifier can be a concatenation of and/or a hash computed over one or more of a software version, a timestamp indicating a time that the authentication request was received, a random or pseudorandom number, a vendor-assigned identifier, and/or a device class identifier. The assigned device identifier can be selected independent of the security solution used in the received authentication request.

In an aspect, the network device can negotiate a shared key with the user device that transmitted the authentication request. In an aspect, the network device can negotiate the shared key in response to the trustworthiness determination. To negotiate the shared key, the network device can require that the user device transmit all parameters necessary for exercising a key agreement protocol.

In an aspect, a Diffie-Hellman key exchange can be used to negotiate the shared key, and the parameters can comprise a public half of a Diffie-Hellman key pair. As an example, the network device can create a key pair (i.e., a shared key and a secret key) by combining the public half of the Diffie-Hellman key pair received from the user device, a private key maintained by the network device, a modulus, and a generator. In an aspect, the modulus and generator can be selected according to standards (e.g., an IETF modp subgroup), or can be negotiated as part of the authentication process.

In step 504, the network device can transmit data comprising the assigned device identifier and information related to the shared key to the user device being authenticated. In an aspect, the device identifier and the information related to the shared key can be transmitted in response to the determination that the authentication request is trustworthy. In an aspect, the network device further can issue a renewal token to the device and transmit the renewal token to the user device in response to the trustworthiness determination. In an aspect, the information related to the shared key can comprise the shared key generated by the network device. In another aspect, the shared key can be provided as an input for a key derivation function. For example, the shared key can be an input for the NIST SP 800-56A Concatenation Key Derivation function to derive an HMAC 160 cipher key, AES 128 cipher key, or another cipher key useful for a specific resource target, such as a DRM license server, with the information related to the shared key comprising the output of the Key Derivation Function.

In step 506, the network device can receive an identity renewal request. The identity renewal request can be received from the user device. In an aspect, the identity renewal request can comprise the device identifier and can be encrypted/authenticated using one or more of a key and a digital signature algorithm. As an example, the identity renewal request can be encrypted using the shared key transmitted to the user device in step 504. In an aspect the received identity renewal request can further comprise the renewal token issued to the user device. When the identity renewal request is received, proof of identity from the user device requesting renewal generally corresponds to the ability for the user device to provide a corresponding key and/or digitally sign the identity renewal request. In step 508, the identity renewal request can be decrypted using the shared key. In step 510, the network device can authenticate the identity renewal request on the basis of the provided device identifier. In step 512, the network device can negotiate a new shared key with the user device in response to the authentication. In an aspect, the new shared key can be negotiated in the same way that the previous shared key was negotiated.

In step 514, the network device can associate the new shared key with the device identifier of the user device requesting renewal. In an aspect, associating the new shared key with the device identifier can comprise updating identity information stored by the network device.

In step 516, a renewal message can be transmitted to the requesting user device. In an aspect, the renewal message can comprise information related to the new shared key and the device identifier. In an aspect, devices can be required to request identity renewal intermittently. For example, identity renewal can be required periodically, such as every, 6, 12, or 24 hours. In an aspect, identity renewal can be required in response to a security update at the network device. In another aspect, the user can request that the identity be considered expired.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    receiving, from a user device, an authentication request according to a first security protocol;
    transmitting, to the user device, a device identifier and information related to a shared key in response to a determination that the authentication request is trustworthy according to the first security protocol;
    receiving an identity renewal request from the user device, wherein the identity renewal request comprises the device identifier and the identity renewal request is encrypted using a shared key derived from the information related to the shared key;
    decrypting the identity renewal request using the shared key;
    authenticating, based on the device identifier, the identity renewal request;
    responsive to the authenticating the identity renewal request, negotiating a new shared key corresponding to the user device;
    associating the new shared key with the device identifier; and
    transmitting, to the user device, the device identifier and information related to the new shared key.

2. The method of claim 1, further comprising, responsive to the determination that the authentication request is trustworthy, issuing a renewal token.

3. The method of claim 2, wherein the identity renewal request further comprises the renewal token.

4. The method of claim 1, wherein the identity renewal request is received after a predefined time period.

5. The method of claim 1, further comprising negotiating the shared key using a Diffie-Hellman key exchange.

6. The method of claim 1, further comprising using the shared key as an input to a key derivation function, and wherein an output of the key derivation function is the information related to the shared key.

7. A method comprising:
    receiving, from a first user device, a first authentication request according to a first security protocol;
    receiving, from a second user device, a second authentication request according to a second security protocol;
    negotiating, with the first user device, a first shared key in response to a determination that the first authentication request is trustworthy according to the first security protocol;
    negotiating, with the second user device, a second shared key in response to a determination that the second authentication request is trustworthy according to the second security protocol;
    transmitting, to the first user device, a first device identifier and information related to the first shared key in response to the determination that the first authentication request is trustworthy according to the first security protocol, wherein the first device identifier and the information related to the first shared key are each independent of security protocols of the authentication requests; and
    transmitting, to the second user device, a second device identifier and information related to the second shared key in response to the determination that the second authentication request is trustworthy according to the second security protocol, wherein the second device identifier and the information related to the second shared key are each independent of security protocols of the authentication requests.

8. The method of claim 7, wherein one or more of the negotiating the first shared key or the negotiating the second shared key comprises using a Diffie-Hellman key exchange.

9. The method of claim 7, further comprising using each shared key as an input to a key derivation function, and wherein an output of the key derivation function is the information related to each shared key.

10. The method of claim 7, further comprising:
    receiving a security solution renewal message according to a third security protocol, the security solution renewal message comprising at least the first device identifier;
    determining whether or not a security breach required use of the third security protocol; and
    assigning a new device identifier associated with the first user device if the security solution renewal message was received because of a security breach.

11. The method of claim 7, further comprising:
    receiving an identity renewal request from the first user device, the identity renewal request comprising the first device identifier and being encrypted using the first shared key;
    negotiating a new shared key with the first user device;

associating the new shared key with the first device identifier; and transmitting the first device identifier and information related to the new shared key to the first user device.

12. The method of claim 11, wherein identity renewal is required after a predefined time period.

13. The method of claim 7, further comprising:

receiving a content request comprising the first device identifier and encrypted using the first shared key, wherein the content request requests access to content secured according to a fourth security protocol;

decrypting, based on the first shared key, the content request;

authenticating, based on the first device identifier, the content request; and facilitating access to the content.

14. An apparatus comprising:

one or more processors; and memory storing processor executable instructions that when executed by the one or more processors, cause the apparatus to:

receive, from a user device, an authentication request according to a first security protocol;

transmit, to the user device, a device identifier and information related to a shared key in response to a determination that the authentication request is trustworthy according to the first security protocol;

receive an identity renewal request from the user device, wherein the identity renewal request comprises the device identifier and the identity renewal request is encrypted using a shared key derived from the information related to the shared key;

decrypt the identity renewal request using the shared key;

authenticate, based on the device identifier, the identity renewal request;

responsive to the authentication of the identity renewal request, negotiate a new shared key corresponding to the user device;

associate the new shared key with the device identifier; and transmit, to the user device, the device identifier and information related to the new shared key.

15. The apparatus of claim 14, wherein the processor executable instructions that, when executed by the one or more processors, further cause the apparatus to, responsive to the determination that the authentication request is trustworthy, issue a renewal token.

16. The apparatus of claim 15, wherein the identity renewal request further comprises the renewal token.

17. The apparatus of claim 14, wherein the identity renewal request is received after a predefined time period.

18. The apparatus of claim 14, wherein the processor executable instructions that, when executed by the one or more processors, further cause the apparatus to negotiate the shared key using a Diffie-Hellman key exchange.

19. The apparatus of claim 14, wherein the processor executable instructions that, when executed by the one or more processors, further cause the apparatus to use the shared key as an input to a key derivation function, and wherein an output of the key derivation function is the information related to the shared key.

20. The apparatus of claim 14, wherein the processor executable instructions that, when executed by the one or more processors, cause the apparatus to authenticate, based on the device identifier, the identity renewal request comprise processor executable instructions that, when executed by the one or more processors, cause the apparatus to:

receive, from a security resource, a challenge comprising a security resource identifier, wherein a security resource authentication request comprises the security resource identifier;

transmit, to the security resource, the security resource authentication request comprising the received security resource identifier and the device identifier;

receive, from the security resource, a security resource authentication result; and associate the security resource authentication result with the device identifier.

* * * * *